(12) United States Patent
Denteneer

(10) Patent No.: US 9,007,932 B2
(45) Date of Patent: Apr. 14, 2015

(54) METHOD FOR CONTROLLING MEDIUM ACCESS IN A MESH NETWORK USING ALLOCATION VECTORS AND STATION CARRYNG OUT SUCH METHOD

(75) Inventor: Theodorus Jacobus Johannes Denteneer, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 515 days.

(21) Appl. No.: 13/202,333

(22) PCT Filed: Feb. 25, 2010

(86) PCT No.: PCT/IB2010/050826
§ 371 (c)(1),
(2), (4) Date: Aug. 19, 2011

(87) PCT Pub. No.: WO2010/103415
PCT Pub. Date: Sep. 16, 2010

(65) Prior Publication Data
US 2011/0310860 A1  Dec. 22, 2011

(30) Foreign Application Priority Data
Mar. 9, 2009  (EP) .................................... 09305215

(51) Int. Cl.
G08C 15/00 (2006.01)
H04L 12/26 (2006.01)
H04B 7/212 (2006.01)
H04L 12/43 (2006.01)
H04J 3/16 (2006.01)
H04W 74/04 (2009.01)

(52) U.S. Cl.
CPC .................................... H04W 74/04 (2013.01)

(58) Field of Classification Search
None
See application file for complete search history.

(56) References Cited

U.S. PATENT DOCUMENTS

2007/0002887 A1* 1/2007 Benveniste .................... 370/437
2007/0019592 A1* 1/2007 Otsuki .......................... 370/338

(Continued)

FOREIGN PATENT DOCUMENTS

WO  WO2006133414 A2  12/2006

OTHER PUBLICATIONS

IEEE P802.11s/D3.0 Draft Standard for Information Technology—Telecommunications and information exchange between systems—Local and metropolitan area networks—Specific requirements—Part 11: Wireless LAN Medium Access Control (MAC) and Physical Layer (PHY) specifications, Amendment 10: Mesh Networking, Mar. 2009, p. 104.*

*Primary Examiner* — Ashley Shivers
(74) *Attorney, Agent, or Firm* — Larry Liberchuk

(57) ABSTRACT

The present invention relates to Method for controlling medium access in a mesh network comprising the following steps: a station of the network receiving a Network Allocation Vector (NAV) setting frame indicating a period of time during which the station cannot access the medium,—the station setting a Network Allocation Vector expiration timer based on the received setting frame, the station detecting a least one reservation made by two other stations in the network, and setting a respective Reservation Allocation Vector (RAV) expiration timer based on the duration of the detected reservation, and storing the identity of the two stations as owners of the reservation, the station updating the NAV expiration timer as the latest of the NAV expiration time of the NAV setting frame and all set respective RAV expiration timers.

9 Claims, 1 Drawing Sheet

(56) References Cited

U.S. PATENT DOCUMENTS

| | | | |
|---|---|---|---|
| 2009/0323611 A1* | 12/2009 | Singh et al. | 370/329 |
| 2010/0226343 A1* | 9/2010 | Hsu et al. | 370/336 |
| 2011/0069628 A1* | 3/2011 | Liu et al. | 370/252 |
| 2013/0051256 A1* | 2/2013 | Ong et al. | 370/252 |

* cited by examiner

ABSTRACT
METHOD FOR CONTROLLING MEDIUM ACCESS IN A MESH NETWORK USING ALLOCATION VECTORS AND STATION CARRYNG OUT SUCH METHOD

FIELD OF THE INVENTION

The present invention relates to a method for avoiding collisions of reservations in wireless communication networks.

This invention is, for example, relevant for mesh networks

BACKGROUND OF THE INVENTION

In a standard infrastructure of a wireless Local Area Network, which is a centralised network, all client stations are in the range of, and attach to an Access Point acting as a master station. In mesh networks, however, not all the stations are within the hearing range of each other, namely radio meshes comprise many hidden terminals. Accordingly, in such networks, there is a risk of seeing interference with ongoing transmissions. Thus, data transmission methods used in standard infrastructure network turn out to be inefficient in mesh networks.

To remedy this issue, it has been proposed in IEEE 802.11 to use Network Allocation Vectors (NAVs) to inhibit medium access of a station when another transmission is already going on. A NAV is set and reset by data transmissions or management frame transmissions. However, it has been noted that this NAV mechanism is not well suited when multiple, simultaneous reservations are pending. Let's detail this deficiency based on an exemplary network comprising five stations A, B, C and D. Station C uses the NAV to inhibit medium access. Stations A and B have little data to transmit and station E is the owner in a reservation by D and E. As stations A and B have little data to transmit, they may foreshorten their transmission. However, existing mechanisms for foreshortening transmission reset the NAV, so that stations C is no longer blocked and can access the medium. Doing so, however, it interferes with the ongoing transmission from D to E, which will be corrupted by any transmission attempt by C.

To avoid such interference, it could obviously be possible to make the NAV permanent, so that it cannot be reset. With this solution, any compliant station sets its NAV as soon as any reservation period starts and goes to a sleep mode until the end of the reservation period, or until the end of the last reservation period if there are multiple, consecutive, reservations. However, this has a second drawback that lots of airtime can be wasted in case a station having reserved the medium, does not have any data to transmit.

SUMMARY OF THE INVENTION

It is an object of the invention to propose a method for controlling medium access in a mesh network overcoming at least one of the above-mentioned drawbacks.

More precisely, it is an object of the invention to propose a method avoiding collisions for multiple overlapping reservations in a mesh network.

Another object of the invention is to propose a method offering good performance in terms of airtime utilisation.

Yet another object of the invention is to propose a method that can be combined with existing standard methods for communication in a mesh network, such as reservation methods, or network management.

To this end, the present invention provides a method for controlling medium access in a mesh network comprising the following steps:
a station of the network receiving a Network Allocation Vector (NAV) setting frame indicating a period of time during which the station cannot access the medium,
the station setting a Network Allocation Vector expiration timer based on the received setting frame,
the station detecting a least one reservation made by two other stations in the network, and setting a respective Reservation Allocation Vector (RAV) expiration timer based on the duration of the detected reservation, and storing the identity of the two stations as owners of the reservation,
the station updating the NAV expiration timer as the latest of the NAV expiration time of the NAV setting frame and all set respective RAV expiration timers.

In such a method, the NAV still determines whether access to the medium is allowed or not. However, the NAV is now set by taking the RAVs into account, and is defined in such a way that access to the medium is allowed only when neither NAV nor any of the RAVs is set. Within the meaning of the present invention, a NAV or a RAV is said to be set when a corresponding NAV expiration timer or RAV expiration timer is set in the station. In all the description, expressions such as NAV (resp. RAV), NAV expiration timer (resp. RAV expiration timer), and NAV counter (resp. RAV counter) will be understood with the same meaning, i.e. as the value stored in the station that is decreased for determining the end of the RAV or NAV.

This method thus avoids any collision in reservations, because a station can access the medium only when all established reservations have ended. However, in order to save airtime, it might be useful that the station can access the medium in case a reservation is foreshortened. In this view, the present invention comprises, in an embodiment where at least one RAV is already set in the station, the following steps:
upon receipt of another NAV setting frame, determining the originator of the frame,
in case the originator is a owner of a reservation corresponding to one of the set RAVs, adapting the corresponding RAV to the received NAV setting frame, and updating the NAV expiration timer accordingly.

In a specific embodiment, the NAV setting frame indicates a release of the RAV, and the RAV expiration timer is thus set as 0

Accordingly, when a reservation is foreshortened, the NAV setting frame is sent by a reservation owner. This frame is received at the station, which then updates the RAV. Subsequently, the NAV is updated so as to take into account this change. Thus, this method allows airtime saving while still ensuring collision avoidance.

However, in case several RAVs are present in the station, overhead associated with manipulating all the RAVs timers can be substantial. Thus, in some embodiments, a method according to the invention comprises the step of determining the number of RAV timers set in the station, and of adapting the RAV to the received NAV only if the number of RAV timers is strictly less than a predetermined number, for example two. Even if this feature reduces the possibility for medium access for the station when reservations are foreshortened, the corresponding RAV timer, and thus the NAV timer are not updated, however it also allows reducing the complication of the solution.

Another object of the invention relates to a station adapted for being set up in a wireless communication network comprising at least two other stations, the station comprising:

means for receiving a NAV setting frame, means for setting a NAV expiration timer upon receipt of a NAV setting frame, means for detecting reservation made by the two other stations, and for setting up a RAV expiration timer based on the reservation duration, means for updating the NAV expiration timer as the latest of the NAV expiration time of the NAV setting frame and all set respective RAV expiration timers.

In another embodiment, the station comprises a set RAV, and further comprises:

means for determining, upon receipt of a NAV setting frame, the originator of the frame, means for comparing the originator of the frame with the owners of the RAV, means for adapting the corresponding RAV to the received NAV setting frame, in case the originator is a owner of the reservation corresponding to one of the set RAVs, and means for updating the NAV expiration timer accordingly.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
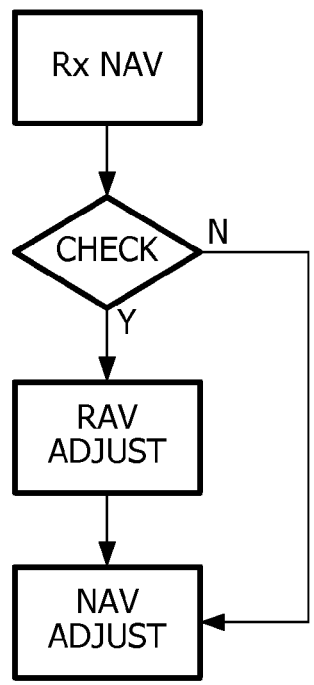
FIG. 1 is a block diagram showing operation of a method according to the invention.

The present invention relates to a method for controlling medium access in a mesh network. In this method, we propose to improve existing mechanisms carrying out Network Allocation Vector (NAV) by introducing multiple Reservation Allocation Vectors (RAVs). Contrary to a NAV, a RAV is associated with one specific reservation. Thus, as soon as the corresponding reservation starts, the RAV is set in a station and initialised to the duration of the reservation. Actually, RAVs are implemented as counters, or timers, that are counted down as time elapses, and that expire as soon as they reach 0. The reservation start and duration are advertised by the reservation owners after the reservation setup, and are known by the neighbouring stations.

However, as explained before, the present invention is such that, in order to allow airtime savings, RAVs may be updated within the course of a reservation. This exemplary embodiment will now be detailed in connection with FIG. 1.

Let's assume that the station having one set RAV receives a NAV setting frame ("Rx NAV"). A NAV setting frame is, for example, a data frame with the duration/ID set, a Request-to-Send/Clear-to-Send (RTS-CTS exchange, or e.g. a CF-end frame. Upon receipt of the frame, the station first checks ("CHECK") whether the setting frame comes from the initiator or the responder of the reservation corresponding to the set RAV. Within the meaning of the present invention, a reservation initiator is a station initiating the transmission after having made a reservation and a reservation responder is a station receiving said data transmission during said reservation period. In this specification, both a reservation initiator and a reservation responder are designated as reservation owners. If the NAV setting frame does not come from any of the initiator or responder of the reservation, then no action is performed. On the contrary, if the setting frame comes from the owner or the responder of the reservation, then the RAV is adjusted ("RAV ADJUST") for this reservation. Such adjustment may consist in setting the RAV as expired, which means setting the RAV expiration timer, or counter, to 0. Such adjustment may also consist in setting the RAV to the currently estimated duration of the intended transmission, which means reducing the RAV expiration timer from the reserved time period to this estimated duration.

Then, since the NAV timer is, in the present invention, set by taking into account the RAVs, the method is such that the NAV is also adjusted ("NAV ADJUST") using the RAVs and the frame. As said previously, the NAV expiration timer is set as the maximum of the current NAV and all the set RAVs expiration timers.

Actually, in a method according to the present invention, a RAV set in a station may be adjusted in three specific occasions:

Upon receipt of a NAV setting frame, as just described,

When a new RAV is set, and

When a RAV expired.

After adjustment of the RAV in the two first situations, the NAV expiration timer is adjusted by the station. In the third case, it is not necessary, because normal expiration of a RAV is already taken into account in the NAV.

As said previously, a method according to the invention is highly advantageous in that it can be used in combination with existing mechanisms. We will now describe, in connection with FIG. 2, an embodiment of the present invention when used with RTS-CTS mechanism, which allows to foreshorten reservation period when possible.

The RTS-CTS mechanism operates as follows:

a source station wanted to transmit data issues a Request to Send (RTS) frame to the intended destination station, the destination station responds with a Clear to Send (CTS) frame, upon receipt of the CTS, the source station transmits data, and destination responds with ACK.

The RTS-CTS frames are, in an embodiment of the present invention, used for resetting the RAVs. Apart from this aspect, RTS-CTS can be used to make the frame exchange more robust against varying channel conditions. Indeed, the RTS-CTS frame exchange then also serves as a test frame exchange to determine whether the channel conditions are sufficient for successful frame exchanges. If this turns out to be not the case, then only the small test frame is lost, rather than the longer data frame. This exchange can also be used to increase robustness to legacy stations that do not implement the reservation method. Indeed, any such legacy station is not aware of the reservation and can potentially start an interfering transmission. The RTS-CTS also, instantly, reserves the medium for all legacy stations.

Figure 2:
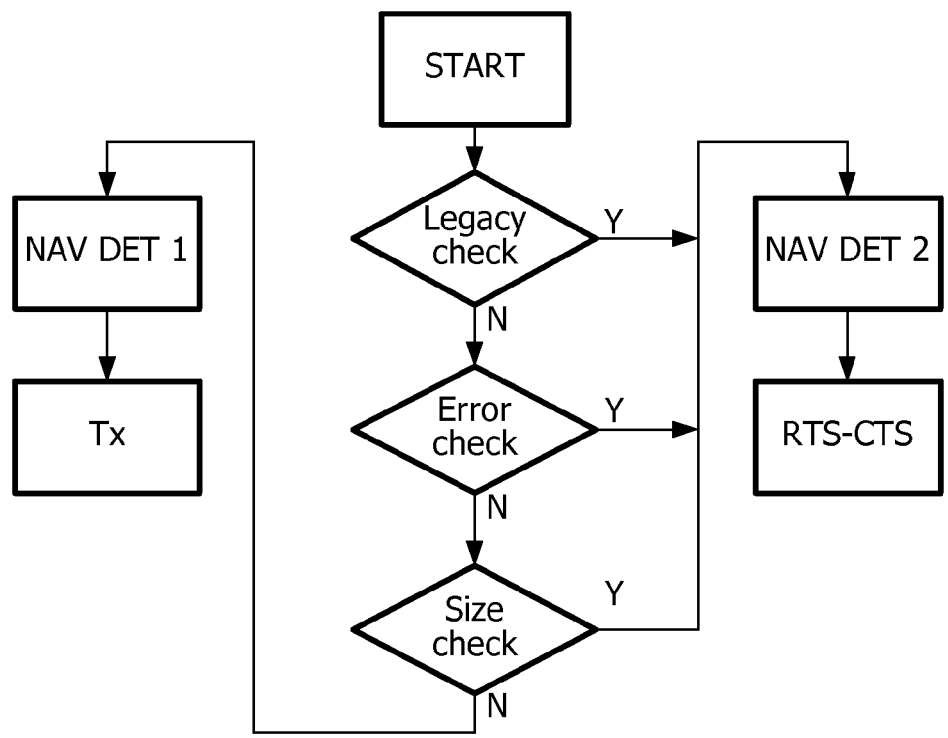
FIG. 2 is a block diagram showing an exemplary embodiment of a method according to the invention.

Thus, in the embodiment shown on FIG. 2, when the reservation period starts ("START"), the station first checks whether predetermined characteristics limits are exceeded or not. Those characteristics limits are:

Legacy station limit ("legacy check"),

Error history limit ("error check"), and

Frame size limit ("size check").

If none of these values is exceeded, then the method goes on with a step of determining NAV setting values ("NAV DET 1"). Once these values are determined, then the station initiates transmission ("Tx"), for example via a data acknowledgment message, or via a data CF-poll.

If, on the contrary, one of the characteristic limits is exceeded, then the method also determines NAV setting values ("NAV DET 2"). Then, the station initiates data transfer via a RTS-CTS exchange ("RTS-CTS"), as previously described.

Now, coming back to the method as shown in FIG. 1, it has been noted that the overhead associated with manipulating a number of RAV counters can be substantial. This is especially the case when receiving a NAV setting frame as in "NAV Rx". Indeed, decision of resetting a RAV and updating the NAV must be implemented quickly, so as allow reuse of the medium. In this view, simplification of the method may be achieved as follows: a station enters into the RAV decision diagram of FIG. 1 when only a limited number of RAVs have been set. In a preferred embodiment, this limited number is equal to two. Thus, if the number of active RAVs exceeds this limit, the stations goes to sleep mode until the end of last RAV; if the number of set RAVs is equal to or below this limit, the station follows the decision diagram.

Moreover, in an alternative embodiment of the present invention, the station may decide to actively manipulate the RAV counters. Such a decision is made based on history and communications needs. Indeed, if communication need is high and a specific reservation has often been shortened, then it is useful to actively listen to the medium so as to detect reservation foreshortening more easily, thus enabling optimal medium access. On the contrary, if the communication needs are low, or the reservation has not been foreshortened on previous occasions, then it is not necessarily useful to actively listen to the medium so as to enable optimal medium access, and the station might alternatively go to sleep.

The present invention is more especially dedicated to mesh networks compliant with IEEE 802.11 standard. More precisely, this invention is highly advantageous in that it can be used in combination will all existing management protocols, reservation protocols or any other protocol defined in 802.11s.

However, it is to be noted that the present invention is not limited to mesh networks, but can be used in any wireless communication network.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless communication and which may be used instead of or in addition to features already described herein.

The invention claimed is:

1. A method for controlling access to a medium in a mesh network comprising:
   receiving, by a station of the mesh network, a first Network Allocation Vector (NAV) setting frame indicating a period of time during which the station cannot access the medium;
   setting a NAV expiration timer based on the first NAV setting frame;
   detecting at least one reservation made by two other stations in the network;
   setting a respective Reservation Allocation Vector (RAV) expiration timer based on the duration of the detected at least one reservation;
   storing the identity of the two stations as owners of the reservation; and
   updating the NAV expiration timer as the maximum of a NAV expiration time of the first NAV setting frame and all of the RAV expiration timers that have been set.

2. The method as recited in claim 1, further comprising, in a station already comprising at least one RAV:
   upon receipt of a second NAV setting frame, determining an originator of the second frame;
   in case the originator is an owner of a reservation corresponding to one of the set RAVs, adapting the corresponding RAV to the second NAV setting frame; and
   updating the NAV expiration timer accordingly.

3. The method as recited in claim 2, wherein the second NAV setting frame indicates a release of the reservation, and the RAV expiration timer is thus set as 0.

4. The method as recited in claim 2, further comprising determining the number of RAV timers set in the station, and adapting the RAV to the second NAV only if the number of RAV timers is strictly less than a predetermined number.

5. The method as recited in claim 4, wherein the predetermined number is equal to 2.

6. The method as recited in claim 1, further comprising, upon receipt of the NAV setting frame:
   the station determining whether one of the following limits is exceeded: a legacy station limit, an error history limit, and a frame size limit;
   in case no limit is exceeded, the station determining the NAV setting values and initiating transmission; and
   in case a limit is exceeded, the station determining the NAV setting values and initiating data transfer via a Request-to-Send/Clear-to-Send (RTS-CTS) frame.

7. The method as recited in claim 1, further comprising the station actively listening to the medium, so as to detect reservation foreshortening.

8. A station being set up in a wireless communication network comprising at least two other stations, the station configured to perform a method comprising:
   receiving, by a station of the mesh network, a first Network Allocation Vector (NAV) setting frame indicating a period of time during which the station cannot access the medium;
   setting a NAV expiration timer based on the first NAV setting frame;
   detecting at least one reservation made by two other stations in the network;
   setting a respective Reservation Allocation Vector (RAV) expiration timer based on the duration of the detected at least one reservation;
   storing the identity of the two stations as owners of the reservation; and
   updating the NAV expiration timer as the maximum of a NAV expiration time of the first NAV setting frame and all of the RAV expiration timers that have been set.

9. The station as recited in claim 8, further comprising:
   determining, upon receipt of a second NAV setting frame, the originator of the frame;
   comparing the originator of the frame with the owners of the RAV;
   adapting the corresponding RAV to the second NAV setting frame, in case the originator is an owner of a reservation corresponding to one of the set RAVs; and
   updating the NAV expiration timer accordingly.

* * * * *